United States Patent Office
3,245,976
Patented Apr. 12, 1966

3,245,976
PROCESS FOR PREPARING 1,4-CIS-BUTADIENE HIGH POLYMERS
Walter Marconi, Alessandro Mazzei, Alessandro Beranger, and Mario Araldi, Milan, and Marcello de Maldè, San Donato Milanese, Italy, assignors to SNAM-Società per Azioni
No Drawing. Filed July 9, 1962, Ser. No. 208,570
Claims priority, application Italy, July 17, 1961, Patent 665,332; Dec. 22, 1961, 23,084/61; Jan. 10, 1962, 419/62
4 Claims. (Cl. 260—94.3)

This invention relates to a process for preparing 1,4-cis-butadiene high polymers and, more particularly, it relates to an improved catalyst system for carrying out the polymerization of butadiene so as to have high yields in 1,4-cis-butadiene.

The catalyst systems herein disclosed comprise two or more components: one of those components is a compound, preferably a halide, of a transition metal. It has been a practice sometimes adopted to distinguish the components of catalyst-systems embodying compounds of transition metals by calling said compounds "catalysts" and the remaining compound or compounds "co-catalysts" although the catalytic effect of these systems depends on the interaction of all the components and it may be argued that the function of the various components can not be so distinguished, it has been found expedient for the sake of clarity to use this nomenclature in this specification and claims.

Thus the compound of transition metals will be called catalysts and the remaining compounds will be called the co-catalysts but it must be clear that this does not imply any theory on the manner in which the various components of a catalyst system interact.

The use of the so-called "transition metals" as catalyst for the polymerization processes of the described kind is generally known in the technique: for "transition metals" we generally intend the elements of the groups IVb, Vb, VIb and VIII of the Periodic Table, and manganese. As aforesaid, the present invention is for improvements in co-catalysts to be used in conjunction with the transition metals having the catalytic function proper.

Broadly stated, the present invention contemplates the use, with a compound of a transition metal as hereinbefore defined, of at least a primary co-catalyst having the general formula

wherein X and Y are members selected from the group consisting of hydrogen, halogen and

wherein R and R' are members selected from the group comprising alkyl, aryl, arylalkyl and cycloalkyl. R and R' can be joined to make up one hydrocarbon ring radical.

These compounds can be complexed with substances capable of yielding electrons, of the kind called "Lewis bases," such as ethers, tertiary amines, tetrahydrofuran.

According to a further improved embodiment, the invention contemplates the employment, in addition to the primary co-catalyst referred to above, a secondary "co-catalyst" which is a member selected from the group consisting of elemental iodine, inorganic iodides and aluminum hydrides, of the kind described above, containing iodine.

In the actual practice of the invention it has been discovered that, in order to obtain good yields of 1,4 cis polymer it is essential that the molar ratio of the primary co-catalyst

referred to above, to that of the compound of the transition metal (catalyst) must exceed 1 (one).

The polymerization procedure, as itself, can be the conventional one, i.e. the polymerization steps can be effected in inert solvents, such as benzene and other aromatics like toluene, xylene; it is preferable to use liquids which are solvents for all the components of the catalytic system, viz. the catalyst proper and the co-catalysts.

The reaction temperature ranges between —20° C. and +70° C., and preferably between +50° C. and +25° C. The polymerization run takes a few hours to be completed.

The components of the catalytic system can be introduced in the reaction vessel individually or all at a time. The catalytic system can also be prepared separately, by admixing individual solution of the components of the catalytic system: by so doing, a solution, or a suspension is obtained according to the cases. This solution, or suspension, very presumably contains the actual catalyst, whose composition and structure, however, have not yet been fully elucidated hitherto. The preparation of these solutions can be effected at any temperatures between 0° C. and 60° C., in an inert atmosphere and at ordinary atmospheric pressures.

Once the polymerization run has been completed, the polymerized mass is withdrawn according to the conventional techniques.

When referring to the yield of solid polymer, it is intended, in this specification, to designate the weight ratio of the polymer which can be coagulated with methanol to the total monomer fed to the polymerization system. This ratio is ordinarily computed on a percent basis.

When the primary co-catalyst is an amino-alane or a halogen-alane, the molar ratio alane/transition metal compound (catalyst) should be greater than 1 and, preferably, should range between 2 and 8. The optimal value of this ratio is a function of the number of Al—H bonds present in the catalyst system as a whole.

This criterion is valid also when a secondary co-catalyst according to the invention is added to the catalyst system, i.e. when elemental iodine or a iodide is used, but, in such a case, also the molar ratio of the iodine (or the iodide) to the compound of the transition metal (e.g. titanium) should be considered, since it is a critical factor as to its influence on the polymerization run.

In practice, the ratio of iodine (or iodide) to the transition metal compound, expressed as a ratio of grams-atoms of iodine to gram-moles of titanium compound should range between 0.25 to 1 and 50:1: a preferred range is between 0.50 to 1 and 15:1.

If a three-component system containing two different hydrides is used, only one of these hydrides containing iodine, the criterion is valid as well. The amount of catalyst to be used is between 0.25% and 5% by weight (in total) with respect to the weight of the starting monomer.

The concentration of the solutions of the monomer are about 10–20% by weight of monomer with respect to the solvent.

Among the primary co-catalysts which can be employed according to the invention there can be cited the halogen hydrides of aluminum as such, and their complexes with Lewis basis such as $AlHCl_2 \cdot (C_2H_5)_2O$;

$AlHBr_2 \cdot (C_2H_5)_2O$; $AlH_2I \cdot (C_2H_5)_2O$; $AlHCl_2 \cdot N(CH_3)_3$ and the like.

Such compounds have the advantage of being non inflammable and this is a paramount advantage.

Among the primary co-catalysts which contain an aluminum-nitrogen bond, there can be cited the amino-alanes such as:

$(CH_3)_2NAlH_2$; $(iso\text{-}C_3H_7)_2NAlH_2$; $(C_6H_5)_2NAlH_2$
$(CH_3)_2NAlHBr$; $(C_2H_5)_2NAlHCl$; $(CH_3)(C_2H_5)NAlHI$ $(C_6H_5CH_2)_2NAlHCl$

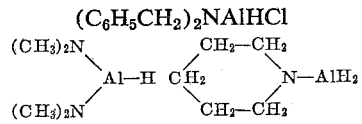

and the like.

The transition metal is preferably a halide but could be an organo-metallic compound.

The invention will be illustrated, but not limited, by the ensuring detailed examples: of these, Examples 1 to 5 inclusive are particularly directed to complexed halogen aluminum hydrides. Examples 6 to 10 inclusive are illustrative of the use of amino-alanes, whereas Examples 11 to 37 inclusive are illustrative of three-component catalyst systems comprising iodine or an iodide as a secondary co-catalyst. The use of three-component systems is conducive to highly stereospecific polymerizations.

EXAMPLES 1–5

In the examples, that follow, butadiene is polymerized with a catalyst system formed by $AlHCl_2 \cdot O(C_2H_5)_2$ and $TiI_4$ at various Al/Ti molar ratios.

Into a two-necked flask of 150 ml. capacity with a magnetic stirrer, previously heated by a flame and allowed to cool down in a nitrogen stream, there is introduced the solvent and the weighed quantities of finely ground $TiI_4$. The flask is then heated with an external bath around 40–50° C. and then the aluminum chlorohydride etherate is added by means of a piston-pipette. The catalyst is allowed to cool down to room temperature while stirring and is then transferred by siphoning into a drink-type bottle previously dried under nitrogen. This bottle is closed by a neoprene seal and a corona-type bottle cap, which is punched so as to expose part of the neoprene seal. The butadiene is introduced by means of a hypodermic syringe and the bottle is put at once into a rotating thermostatic bath for the length of time desired.

At the end of that period, the bottle is taken out and its content is discharged into about one litre of methyl alcohol containing 1% of an anti-oxidant. The precipitated polymer, having gummy appearance, is dried in a vacuum furnace at room temperature.

The conditions of polymerization and the results of infra-red analysis as described in the following Table 1,

Table 1

| No. test | $AlHCl_2 \cdot O(C_2H_5)_2$, m. moles | $TiI_4$, m. moles | Molar Al/Ti ratio | Solvent, cm.³ | Butadiene, gr. | T., °C. | Duration, hours | Yield, percent | I.R. Analysis ||||
|---|---|---|---|---|---|---|---|---|---|---|---|---|
| | | | | | | | | | 1,4 cis, percent | 1,4 trans, percent | 1,2, percent | Unsaturated total |
| 1 | 1.78 | 0.59 | 3 | Benzene 100 | 24 | +5 | 16 | 95.2 | 93.7 | 2 | 4.3 | 98 |
| 2 | 2.63 | 0.66 | 4 | do | 15 | +5 | 7 | 87 | 88.1 | 7.7 | 4.1 | 95 |
| 3 | 2.16 | 0.432 | 5 | do | 18 | +5 | 60 | 80 | 88.4 | 7.2 | 4.4 | 92 |
| 4 | 2.1 | 0.288 | 7 | do | 20 | −5 | 12 | 70 | 89.8 | 6.5 | 3.6 | 93 |
| 5 | 3.2 | 0.32 | 10 | do | 19 | −5 | 12 | 60 | 85 | 12 | 3 | 95 |

EXAMPLE 6

Butadiene is polymerized using the $TiI_2Cl_2$ mixture obtained by joining equimolecular amounts of $TiI_4$ and $TiCl_4$.

We used the following recipe:

Anhydrous benzene _____ ml ____ 100
$AlHCl_2 \cdot O(C_2H_5)_2$ _____ millimoles __ 739
$TiI_2Cl_2$ _____ do ____ 1.058
Butadiene _____ g __ 15
Al/Ti molar ratio _____ 7

The catalyst is prepared directly in a bottle and this is allowed to age for 15 minutes at room temperature while stirring. The polymerization is conducted at +5° C. for a duration of 18 hours. The yield of solid polymer is 63% and on I.R. analysis the latter shows the following structure:

88.2% 1,4-cis; 7.1% 1,4-trans; 4.8% 1–2. Total unsaturated 96%.

EXAMPLES 7–10

Acetylacetonato of di- or trivalent cobalt is used as a catalyst.

The catalyst is directly prepared in a drink-type bottle adding orderly: a solution with known concentration of the cobalt acetyl acetonate, anhydrous benzene up to a volume of 100 ml. and then $AlHCl_2 \cdot O(C_2H_5)_2$ diluted in benzene. On the addition of the hydride the intensive coloration of the cobalt compound disappears immediately and there is obtained a homogeneous or at least seemingly homogeneous solution, which slowly becomes increasingly brown.

The bottle is allowed to age at room temperature for about 20 minutes, then the monomer is added. The polymerization takes place in homogeneous phase and can be conducted to completion also without any stirring. On termination, the dense solution is discharged into methanol containing a phenolic antioxidant and the polymer, having a very high molecular weight, is dried under vacuum. The results of the various tests are summarized in the following table:

Table 2

| No. test | Cobalt compounds, m. moles | $AlHCl_2 \cdot O(C_2H_5)_2$, m. moles | Molar Al/Co ratio | Solvent, cm.³ | Butadiene, gr. | T., °C | Duration, hours | Yield, percent | I.R. Analysis ||||
|---|---|---|---|---|---|---|---|---|---|---|---|---|
| | | | | | | | | | 1,4 cis, percent | 1,4 trans, percent | 1,2, percent | Unsaturated total |
| 7 | COA₂,¹ 0.06 | 0.6 | 10 | Benzene 100 | 14 | +20 | 48 | 24 | 93.9 | 2.4 | 3.7 | 97 |
| 8 | COA₃, 0.0316 | 0.538 | 17 | do | 16 | +20 | 48 | 15 | 96.1 | 2 | 1.9 | 97 |
| 9 | COA₃, 0.0158 | 0.538 | 34 | do | 15 | +25 | 48 | 25 | 95.2 | 1.8 | 3 | 94 |
| 10 | COA₃, 0.0158 | 1.39 | 85 | do | 11 | +25 | 60 | 45 | 90.8 | 2.9 | 6.3 | 91 |

¹ A=acetyl-acetonic radical.

EXAMPLES 11–14

The aluminum dichloro-monohydride is replaced by the corresponding brominated compound.

Hence the catalyst system is as follows:

$$AlHBr_2 \cdot O(C_2H_5)_2 + TiI_2Cl_2$$

The modalities of preparing the catalyst are analogous to those in the preceding tests; it is made directly in the reaction vessel and generally subjected to ageing at room temperature for 15 minutes.

In the following table are reported the conditions of polymerization and the results obtained.

EXAMPLE 17

We used as a catalyst system the mixture resulting from joining of $TiI_2Cl_2$ with $AlHBrN(CH_3)_2$. The catalyst is prepared directly in a drink-type bottle previously dried under nitrogen, adding in order: 100 ml. of anhydrous benzene; 2.5 ml. of a benzenic suspension of $TiI_2Cl_2$ (equivalent to 0.332 millimoles of $TiI_2Cl_2$) and then 2 ml. of a benzenic solution of bromo-dimethylamino-alane 0.006 m.

The bottle is capped as already described and allowed to age for about 10 minutes over a shaking machine at Table 3

| No. Test | $AlHBr_2 \cdot O(C_2H_5)_2$, m. moles | $TiI_2Cl_2$, m. moles | Molar Al/Ti ratio | Solvent, cm.³ | Butadiene, gr. | T., °C. | Duration, hours | Yield gr., percent | 1,4 cis, percent | 1,4 trans, percent | 1,2, percent | Unsaturated total |
|---|---|---|---|---|---|---|---|---|---|---|---|---|
| 11 | 1.78 | 1.19 | 1.5 | Benzene 100 | 12 | +5 | 15 | 98 | 92 | 4 | 4 | 95 |
| 12 | 2.38 | 1.38 | 1.7 | do | 13.2 | +5 | 16 | 90 | 90.6 | 4.8 | 4.5 | 94 |
| 13 | 2.38 | 1.19 | 2 | do | 11.6 | +5 | 16 | 92 | 90.1 | 5.5 | 4.4 | 94 |
| 14 | 2.97 | 0.99 | 3 | do | 10.5 | +5 | 16 | 85 | 87.4 | 8.3 | 4.2 | 94 |

EXAMPLE 15

Butadiene is polymerized with a catalyst system formed by $AlH_2N(CH_3)_2$ and $TiI_4$.

Into a flask of 150 ml. capacity, with two necks and with a magnetic stirrer, previously heated with a flame and allowed to cool down in a nitrogen stream, there are introduced the finely ground $TiI_4$ (0.226 g. = 0.405 millimoles) and 100 ml. of anhydrous benzene. After this charge there are added 1.215 millimoles of a benzenic solution of dimethyl-amino-alane by means of the use of a piston-pipette.

The catalyst is allowed to age at room temperature under stirring for 20 minutes and is then transferred by siphoning into a drink-type bottle previously dried under nitrogen.

This is closed by a neoprene seal and a corona-type cap that is punched in such a way as to expose a part of the neoprene seal.

Then 10 g. of butadiene are introduced by means of a hypodermic syringe and at once the bottle is put into a rotating thermostatic bath at a temperature of +5° C. After 17 hours time the content of the bottle is discharged into about one litre of methyl alcohol containing 1% of antioxidant. The precipitated polymer, of gummy appearance, is dried in a vacuum oven at room temperature.

There are obtained 9 g. of polymer, with 90% yield which on infrared analysis shows the following structure: 92% 1,4-cis; 3.5% 1,4-trans; 4.5% 1–2. Unsaturated total 99%.

EXAMPLE 16

Butadiene is polymerized using the mixture of $TiI_2Cl_2$ obtained by joining equimolecular amounts of $TiI_4$ and $TiCl_4$, and dimethyl amino-alane. The modalities are analogous to those of the preceeding example. The quantities are as follows:

Anhydrous benzene _____ ml__ 100
$TiI_2Cl_2$ _____ millimoles__ 0.332
$AlH_2N(CH_3)_2$ _____ do____ 0.996
Butadiene _____ g__ 15
Al/Ti molar ratio _____ 3

The polymerization is conducted at +5° C. for 19 hours. The yield of solid polymer is 90% and on I.R. analysis this has the following structure:
91% 1,4-cis; 4.6% 1,4-trans; 4.4% 1,2. Unsaturated total 97%.

room temperature. Then 13 g. butadiene are added by means of a hypodermic syringe and at once the bottle is placed into a rotating thermostatic bath at the temperature of +5° C. After 18 hours time the content of the bottle is discharged into methyl alcohol containing a phenolic antioxidant and the polymer dried under vacuum. There are obtained 10.5 g. of gummy polymer, corresponding to an 80% yield.

On I.R. analysis it shows the following structure:

91.5% 1,4-cis; 4.5% 1,4-trans; 4% 1,2. Unsaturated total 96%.

EXAMPLE 18

We have prepared the chloro-diphenylamino-alane from the reaction:

$$AlH_2Cl \cdot NR_3 + HN(C_6H_5)_2 = AlHClN(C_6H_5)_2 \cdot NR_3 + H_2$$

reacting benzenic solutions of chloro-alane and diphenylamine at room temperature and collecting the hydrogen developed. The completion of the reaction is indicated by the expected hydrogen development. The solvent is removed under vacuum and the dried and weighed solid is redissolved in benzene. Said benzene solution is reacted with $TiI_4$, after having determined its concentration by means of analysis of the aluminum.

The catalyst system is thus formed by $$AlHClN(C_6H_5)_2 + TiI_4$$

We have carried out the procedure described in Example 1.

The recipe is as follows:

Benzene _____ ml__ 100
$TiI_4$ _____ millimoles__ 0.29
$AlHClN(C_6H_5)_2 \cdot NR_3$ _____ do____ 1.74
Al/Ti molar ratio _____ 6
Butadiene _____ g__ 10
Polymerization temperature _____ ° C__ +5
Duration of test _____ hours__ 20
Yield 5 g. of polymer _____ percent__ 50

I.R. analysis: 89.5% 1,4-cis; 5% 1,4-trans; 5.5% 1–2. Unsaturated total 98%.

EXAMPLE 19

We prepared N-piperidine-alane by reacting benzenic solutions of piperidine and of aluminum hydride complexed with trimethyl amine according to the reaction:

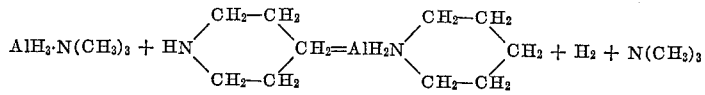

The butadiene is polymerized with the catalyst system:

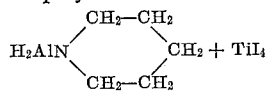

The procedure followed is analogous to that of the preceding examples.

about one litre of methyl alcohol containing 1% of an antioxidant. The precipitated polymer is dried in an oven under vacuum at room temperature, then the polymer yield is calculated.

The conditions of polymerization, the quantities of the catalyst components and the results of the infrared analysis, are reported in the following Table No. 4.

Table 4

| Test No. | $AlHCl_2 \cdot O(C_2H_5)_2$ m. moles | $TiCl_4$, m. moles | $I_2$, m. mols | Moles Al / Moles Ti | Gr. atome $I_2$ / Moles Ti | Solvent, cm.³ | Butadiene, gr. | T., °C. | Dur., hrs. | Yield gr., percent | I.R. analysis 1,4 cis, percent | 1,4 trans, percent | 1,2, percent | Unsaturated total |
|---|---|---|---|---|---|---|---|---|---|---|---|---|---|---|
| 20 | [1] 1.82 | 0.227 | 0.1137 | 8 | 1 | Benzene 100 | 10 | +5 | 14 | 20 | 92 | 3 | 5 | 96 |
| 21 | [2] 1.82 | 0.227 | 0.1137 | 8 | 1 | ___do_____ | 12 | +5 | 19 | 45 | 92.5 | 2.9 | 4.6 | 97 |
| 22 | 2.275 | 0.227 | 0.227 | 10 | 2 | Toluene 100 | 7 | +5 | 17 | 30 | 91.2 | 4.3 | 4.5 | 97 |
| 23 | [3] 2.27 | 0.227 | 0.445 | 10 | 4 | Benzene 100 | 10 | +5 | 18 | 80 | 90.2 | 6.1 | 3.7 | 96 |
| 24 | 2.27 | 0.227 | 0.445 | 10 | 4 | ___do_____ | 13 | +5 | 18 | 85 | 90 | 5.4 | 4.6 | 95 |
| 25 | 2.73 | 0.227 | 0.682 | 12 | 6 | ___do_____ | 12 | +5 | 14 | 73 | 90.5 | 5.2 | 4.3 | 95 |

[1] $[\eta]$ in benzene at 32° C.=1.94 dl./g.
[2] Catalyst prepared in the presence of monomer—$[\eta]$ in benzene at 32° C.=2.54 dl./g.
[3] Catalyst aged at 60° C. for 30'—$[\eta]$ in benzene at 32° C.=3.7 dl./g.

We used the following recipe:

Anhydrous benzene _____ml__ 100
$TiI_4$ _____millimoles__ 0.3
$AlH_2N(CH_2)_5$ _____do____ 0.75
Al/Ti molar ratio _____ 2.5
Butadiene _____g__ 9
Temperature of polymerization _____° C__ +5
Duration of test _____hours__ 17
Solid polymer obtained 9 g. _____percent__ 100

I.R. analysis: 90.2% 1,4-cis; 5.1% 1,4-trans; 4.7% 1–2. Unsaturated total 97%.

EXAMPLES 26–31

With the polymerization of butadiene, a catalyst system is employed which is formed of $$AlI_3 + TiCl_4 + AlHCl_2 \cdot O(C_2H_5)_2$$

at various ratios between the components. The catalyst is prepared directly in a drink type bottle as previously described, adding orderly: anhydrous benzene, the benzenic solution of $TiCl_4$, the benzenic solution of $AlI_3$, and then the benzenic solution of $AlHCl_2 \cdot O(C_2H_5)_2$.

The bottle is closed and the butadiene is introduced by means of a hypodermic syringe. The conditions of polymerization and the results of I.R. analysis are reported in the following Table No. 5.

Table 5

| Test No. | $AlHCl_2 \cdot O(C_2H_5)_2$ m. moles | $TiCl_4$ m. mol. | $AlI_3$ m. mol. | Moles Al / Moles Ti | Gr. atome $I_2$ / Moles Ti | Solvent, cm.³ | Butadiene, gr. | T., °C. | Dur., hrs. | Yield, percent | I.R. Analysis 1,4 cis percent | 1,4 trans percent | 1,2 percent | Unsaturated total |
|---|---|---|---|---|---|---|---|---|---|---|---|---|---|---|
| 26 | 1.36 | 0.227 | 0.0455 | 6 | 0.6 | Toluene 100 | 11 | +5 | 18 | 60 | 90 | 5.9 | 4.1 | 97 |
| 27 | 1.48 | 0.227 | 0.057 | 6.5 | 0.75 | ___do_____ | 11 | +5 | 18 | 70 | 92.2 | 3.4 | 4.4 | 96 |
| 28 | 1.48 | 0.227 | 0.227 | 6.5 | 3 | ___do_____ | 10 | +5 | 18 | 83 | 94 | 1.8 | 2 | 95 |
| 29 | [1] 1.59 | 0.227 | 0.303 | 7 | 4 | Benzene 100 | 12 | +5 | 17 | 65 | 95.1 | 0.8 | 4.1 | 98 |
| 30 | 1.59 | 0.227 | 0.303 | 7 | 4 | ___do_____ | 11 | +5 | 17 | 90 | 95 | 1 | 4 | 98 |
| 31 | 1.64 | 0.273 | 0.546 | 6 | 6 | ___do_____ | 12 | +5 | 16 | 63 | 94 | 1.9 | 4.1 | 95 |

[1] Catalyst aged at +50° C. per 30' $[\eta]$ in benzene at +32° C.=4.05 dl./g.

EXAMPLES 20–25

In the following examples, butadiene is polymerized with a catalyst system formed of:

$$I_2 + TiCl_4 + AlHCl_2 \cdot O(C_2H_5)_2$$

in various molar ratios between the three components. Into a drink-type bottle of 200 cubic cm. capacity, previously heated on a free flame and allowed to cool down in a nitrogen stream, anhydrous benzene is introduced as well as the needed quantities of benzenic sloutions of $TiCl_4$ and of $I_2$. Thereafter, the neded quantity of a benzenic solution with known concentration of chloro-alane etherate is introduced under stirring. The bottle is sealed with a neoprene seal and a corona-type bottle cap which is punched so as to expose part of the neoprene seal. Then the bottle is kept for about 10 minutes over a shaking machine at room temperature to complete the reaction between the components of the catalyst.

Finally butadiene is added by means of a hypodermic syringe and immediately the bottle is put into a rotary thermostatic bath for the time needed. At the end of this period, the content of the bottle is discharged into

EXAMPLE 32

In the following polymerization test, the chloro-alane etherate was replaced by the corresponding compound complexed with trimethyl amine. Hence the catalyst system is formed of $AlI_3 + TiCl_4 + AlHCl_2 \cdot N(CH_3)_3$. The modalities followed are analogous to those previously described. We report the quantities of the catalyst components, the conditions of polymerization and the results of I.R. analysis.

Benzene _____ml__ 100
$TCl_4$ _____millimoles__ 0.227
$AlI_3$ _____do____ 0.227
$AlHCl_2 \cdot N(CH_3)_3$ _____do____ 1.48
Moles of $AlHCl_2 \cdot NR_3$ _____ 6.5
$\dfrac{\text{Gr. atome } I^-}{\text{Moles of TiCl}_4}$ _____ 3
Butadiene _____g__ 8
Temperature of polymerization _____° C__ +5
Duration _____hours__ 17
Yield of solid polymer _____percent__ 95

I.R. analysis: 94% 1,4-cis; 1.7% 1,4-trans; 4.3% 1,2. Unsaturated total, 100%.

EXAMPLE 33

In this test, butadiene was polymerized employing dimethyl amino alane as a reducing agent. Then the catalyst system is formed by $$AlH_3 + TiCl_4 + AlH_2N(5CH_3)_2$$

The catalyst was prepared in a bottle as previously described. The recipe is as follows:

| | | |
|---|---|---|
| Toluene | ml | 100 |
| TiCl$_4$ | millimoles | 0.227 |
| AlH$_3$ | do | 0.227 |
| AlH$_2$N(CH$_3$)$_2$ | do | 0.57 |
| Al/Ti molar ratio | | 2.5 |
| G. atome I$^-$ / TiCl$_4$ | | 3 |
| Butadiene | g | 8 |
| Polymerization temperature | °C | +5 |
| Duration | hours | 18 |
| Yield | percent | 87 |

I.R. analysis: 94% 1,4-cis; 1.4% 1,4-trans; 4.6% 1,2. Unsaturated total, 100%.

[η] in benzene at +36° C. = 3.0 dl./g.

EXAMPLE 34

We have obtained the bromo-dimethylamino-alane by reaction of dimethyl amine on bromo-alane according to the scheme:

$$AlH_2Br \cdot N(CH_3)_3 + HN(CH_3)_2 = AlHBrN(CH_3)_2 + H_2 + N(CH_3)_3$$

Then butadiene is polymerized with a catalyst system formed by: $AlH_3 + TiCl_4 + AlHBrN(CH_3)_2$.

The quantities employed in these tests and the conditions of polymerization are as follows: the modalities are the same as in the preceding examples:

| | | |
|---|---|---|
| Benzene | ml | 100 |
| TiCl$_4$ | millimoles | 0.227 |
| AlH$_3$ | do | 0.227 |
| AlHBrN(CH$_3$)$_2$ | do | 1.36 |
| Al/Ti molar ratio | | 6 |
| I$^-$/Ti | | 3 |
| Butadiene | g | 9 |
| Polymerization temperature | °C | +5 |
| Duration | hours | 15 |
| Total yield | percent | 100 |

I.R. analysis: 94.2% 1,4-cis; 1.8% 1,4-trans; 4% 1,2; Unsaturated total, 97%.

EXAMPLE 35

By means of the following reaction:

$$AlH_2Cl \cdot N(CH_3)_3 + HN(CH_6H_5)_2 = AlHClN(C_6H_5)_2 \cdot NR_3 + H_2$$

we obtained chloro-diphenylamino-alane and this, jointly with TiCl$_4$ and AlH$_3$, polymerizes butadiene in a stereospecific manner.

The recipe employed is the following:

| | | |
|---|---|---|
| Benzene | ml | 100 |
| TCl$_4$ | millimoles | 0.227 |
| AlH$_3$ | do | 0.227 |
| AlHClN(C$_6$H$_5$)$_2$·NR$_3$ | do | 1.36 |
| Al/Ti molar ratio | | 6 |
| I$^-$/TiCl$_4$ | | 3 |
| Butadiene | g | 11 |
| Polymerization temperature | °C | +5 |
| Duration | hours | 18 |
| Yield | percent | 82 |

I.R. analysis: 94.1% 1,4-cis; 1.5% 1,4-trans; 4.4% 1,2. Unsaturated total, 99%.

EXAMPLE 36

As a reducing aluminum compound in this polymerization test, diphenyl-amino-alane was empoyed, as obtained by reacting AlH$_3$·N(CH$_3$)$_3$ and diphenyl amine. Hence the catalyst system is formed of:

$$AlH_3 + TiCl_4 + AlH_2N(C_6H_5)_2$$

The modalities used are analogous to those of the preceding examples.

We report the quantities employed.

| | | |
|---|---|---|
| Toluene | ml | 100 |
| TiCl$_4$ | millimoles | 0.227 |
| AlH$_3$ | do | 0.31 |
| AlH$_2$N(C$_6$H$_5$)$_2$·NR$_3$ | do | 0.68 |
| Al/Ti molar ratio | | 3 |
| I$^-$/TiCl$_4$ | | 4 |
| Butadiene | g | 12 |
| Duration | hours at +5° C | 18 |
| Yield | percent | 76 |

I.R. analysis: 93.6% 1,4-cis; 1.7% 1,4-trans; 4.7% 1,2. Unsaturated total, 97%.

EXAMPLE 37

We obtained N-piperidino-alane by reaction of benzenic solutions of AlH$_3$·N(CH$_3$)$_3$ and piperidine. Hence butadiene was polymerized, with the modalities described, employing a catalyst system formed of:

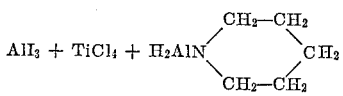

The recipe is as follows:

| | | |
|---|---|---|
| Toluene | ml | 100 |
| TiCl$_4$ | millimoles | 0.227 |
| AlH$_3$ | do | 0.227 |
| AlH$_2$N(CH$_2$-CH$_2$)$_2$CH$_2$ | do | 0.57 |
| Al/Ti molar ratio | | 2.5 |
| I$^-$/TiCl$_4$ | | 3 |
| Butadiene | g | 11 |
| Polymerization temperature | °C | +5 |
| Duration | hours | 18 |
| Yield | percent | 95 |

I.R. analysis: 94.5% 1,4-cis; 1.3% 1,4-trans; 4.2% 1,2. Unsaturated total, 99%.

[η] in benzene at +32° C. = 4.2 dl./g.

EXAMPLE 38

We are reporting by way of example a test of polymerization of butadiene on pilot plant scale, by means of the use of a catalyst system formed of $$AlH_3 + TiCl_4 + AlHCl_2 \cdot O(C_2H_5)_2$$

Into a carbon-steel reactor of 120 litres capacity equipped with a turbine electro-stirrer, with jacket-cooling, there are fed orderly: 60 kg. of anhydrous toluene; 5 kg. of butadiene; 46 ml. of AlHCl$_2$·O(C$_2$H$_5$)$_2$ (290 millimoles); 1.125 kg. of a toluenic solution containing 0.043 moles/kg. of AlH$_3$ (for 48.4 millimoles total) and 1.070 kg. of a toluenic solution containing 0.045 moles/kg. of TiCl$_4$ (equivalent to 48.3 millimoles).

$$Al/Ti \text{ molar ratio} = 6 \frac{g. \text{ atome } I^-}{moles \text{ of } TiCl_4} = 3$$

Concentration of the catalyst: 1.5% by weight with respect to the monomer.

The polymerization was started and conducted at 0° C. There were taken samples of solution from the reactor at regular time intervals and on these are determined the conversion, the viscosity and the structure.

We are reporting the results of the test:

| Sample | Time | Mooney viscosity ML 100-4 | Conversion, percent | I.R. Analysis | | | Unsaturated total |
|---|---|---|---|---|---|---|---|
| | | | | 1,4-trans, percent | 1,2, percent | 1,4-cis, percent | |
| 1 | 30 min | | 28.2 | 0.8 | 3.8 | 95.4 | 98 |
| 2 | 1 hr | 51.5 | 41.7 | | | | |
| 3 | 2 hrs | 62.5 | 57.4 | 0.6 | 3.9 | 95.5 | 99 |
| 4 | 3 hrs | 70.5 | 73.4 | | | | |
| 5 | 4 hrs | 73.5 | 80 | 0.5 | 3.7 | 95.8 | 99 |

EXAMPLE 39

In this test of polymerization of butadiene and in the three successive tests, other metal iodides were tested which are other than $AlI_3$, keeping unaltered the titanium compound and the reducer based on aluminum hydrides. In the present example the catalytic system is formed of: $BiI_3+TiCl_4+AlHCl_2 \cdot O(C_2H_5)_2$. Into a flask of 100 ml. capacity there are introduced 50 ml. of toluene, 0.227 millimoles of $TiCl_4$ and 0.475 millimoles of $BiI_3$ in the solid state, in such a manner that the ratio g. atome $I^-$/moles of $TiCl_4$ be 6.3.

The stirred suspension is kept at $+50°$ C. for about 10 minutes and is then allowed to cool down in inert atmosphere. Then 1.59 millimoles of chloro-alane etherate (Al/Ti molari ratio=7) are added and the whole is siphoned into a drink-type bottle previously dried under nitrogen, employing further 50 ml. of toluene as a washing liquid. The bottle is sealed and there are introduced 9 g. of butadiene as already described. The polymerization is conducted in a rotating thermostatic bath at the temperature of $+5°$ C. for 20 hours. Yield of solid polymer 40%. On I.R. analysis, it shows the following structure:

94.7% 1,4-cis; 1.3% 1,4-trans; 4% 1,2. Unsaturated total, 96%.

$[\eta]$ in benzene at $+32°$ C.=7.15 dl./g.

EXAMPLE 40

We carried out this polymerization according to what is described in Example 39. The catalyst system employed is formed of: $LiI+TiCl_4+AlHCl_2 \cdot O(C_2H_5)_2$. The recipe is as follows:

| | |
|---|---|
| Toluene _____ml__ | 120 |
| $TiCl_4$ _____millimoles__ | 0.229 |
| LiI _____do____ | 0.916 |
| $AlHCl_2 \cdot O(C_2H_5)_2$ _____do____ | 1.49 |
| Al/Ti molar ratio | 6.5 |
| G. atome $I^-$ / $TiCl_4$ | 4 |
| Butadiene _____g__ | 12 |
| Temperature _____° C__ | +5 |
| Duration _____hours__ | 19 |
| Yield _____percent__ | 30 |

I.R. analysis: 93.2% 1,4-cis; 2.4% 1,4-trans; 4.4% 1,2. Unsaturated total, 97%.

$[\eta]$ in benzene at $+32°$ C.=2.52 dl./g.

EXAMPLE 41

The catalyst system employed is: $MgI_2+TiCl_4+AlHCl_2 \cdot O(C_2H_5)_2$. The modalities are analogous to those described in Example 39. The recipe is as follows:

| | |
|---|---|
| Toluene _____ml__ | 100 |
| $TiCl_4$ _____millimoles__ | 0.357 |
| $MgI_2$ _____do____ | 0.89 |
| $AlHCl_2 \cdot O(C_2H_5)_2$ _____do____ | 2.32 |
| Al/Ti molar ratio | 6.5 |
| G. atome $I^-$ / $TiCl_4$ | 5 |
| Butadiene _____g__ | 9 |
| Temperature _____° C__ | +5 |
| Duration _____hours__ | 20 |
| Yield _____percent of solid polymer__ | 25 |

I.R. analysis: (Approximative) 85% 1,4-cis; 8% 1,4-trans; 7% 1,2.

EXAMPLE 42

With the modalities followed in Example 39 and using the catalysts system formed of: $CoI_2+TiCl_4+AlHCl_2 \cdot O(C_2H_5)_2$, we polymerized butadiene with the following recipe:

| | |
|---|---|
| Toluene | 100 ml. |
| $TiCl_4$ | 0.26 millimoles. |
| $CoI_2$ | 0.52 millimoles. |
| $AlHCl_2 \cdot O(C_2H_5)_2$ | 1.56 millimoles. |
| Al/Ti ratio | 6. |
| G. atome $I^-$ / $TiCl_4$ | 4. |
| Butadiene | 11 g. |
| Temperature | +5° C. for 17 hours duration. |
| Yield | 30%. |

I.R. analysis: 91% 1,4-cis; 4.7% 1,4-trans; 4.3% 1,2. Unsaturated total, 95%.

EXAMPLE 43

In this test butadiene is polymerized using a catalyst obtained from $TiCl_4$ and $AlHI_2 \cdot O(C_2H_5)_2$. In this case, as in the subsequent ones, since iodine is present in the reducing aluminum compound, the addition of another iodine component such as $I_2 \cdot AlI_3$ etc. becomes superfluous. The modalities are analogous to those described in Example 39. The recipe is as follows:

| | |
|---|---|
| Toluene | 100 ml. |
| $TiCl_4$ | 0.277 millimoles. |
| $AlHI_2 \cdot O(C_2H_5)_2$ | 1.14 millimoles. |
| Al/Ti molar ratio | 5. |
| Butadiene | 12 g. |
| Temperature | +5° C. for the duration of 18 hours. |
| Yield | 95%. |

I.R. analysis: 92% 1,4-cis; 3.6% 1,4-trans; 4.4% 1,2. Unsaturated total, 97%.

$[\eta]$ in benzene at $+32°$ C.=4.18 dl./g.

EXAMPLE 44

Butadiene is polymerized with a catalyst system formed of $TiCl_4$ and a mixture of chlorine and iodine-alanes-etherates. The modalities are analogous to those described in Example 20.

We report the quantities employed:

| | |
|---|---|
| Toluene _____ml__ | 100 |
| $TiCl_4$ _____millimoles__ | 0.227 |
| $AlHCl_2 \cdot O(C_2H_5)_2$ _____do____ | 0.45 |
| $AlHI_2 \cdot O(C_2H_5)_2$ _____do____ | 1.14 |
| Al/Ti molar ratio | 7 |
| $AlHI_2$ / $AlHCl_2$ | 2.5 |
| Butadiene _____g__ | 10 |

The polymerization is carried out at the temperature of +5° C. for the duration of 19 hours. There are obtained 9 g. of polymer with a yield of 90%.

I.R. analysis: 9⅓% 1,4-cis; 4.7% 1,4-trans; 4% 1,2. Unsaturated total, 99%.

EXAMPLE 45

The catalyst system is the same as in the preceding example, with a different ratio between iodine and chloroalane. The quantities are the following:

| | | |
|---|---|---|
| Toluene | ml | 100 |
| TiCl$_4$ | millimoles | 0.227 |
| AlHCl$_2$·O(C$_2$H$_5$)$_2$ | do | 0.91 |
| AlHI$_2$·O(C$_2$H$_5$)$_2$ | do | 0.2275 |
| Al/Ti molar ratio | | 5 |
| $\frac{AlHI_2}{AlHCl_2}$ | | 0.25 |
| Butadiene | g | 10 |

Polymerization is carried out for 16 hours at the temperature of +5° C. There are obtained 4 g. of polybutadiene (40%) which shows the following structure on I.R. analysis:

91% 1,4-cis; 4.6% 1,4-trans; 4.4% 1,2. Unsaturated total, 96%.

EXAMPLE 46

Butadiene is polymerized with a catalyst system formed of:

TiCl$_2$(OiC$_3$H$_7$)$_2$+AlI$_3$+AlHCl$_2$·O(C$_2$H$_5$)$_2$

The catalyst was prepared directly in the reaction vessel as described in Example 20. The recipe is as follows:

| | | |
|---|---|---|
| Toluene | ml | 100 |
| TiCl$_2$(iC$_3$H$_7$O)$_2$ | millimoles | 0.27 |
| AlI$_3$ | do | 0.36 |
| AlHCl$_2$·O(C$_2$H$_5$)$_2$ | do | 1.62 |
| Al/Ti molar ratio | | 6 |
| $\frac{G.\ atome\ I^-}{TiCl_2(OR)_2}$ | | 4 |
| Butadiene | g | 9 |
| Temperature of polymerization | °C | +5 |
| Duration | hours | 20 |
| Yield | percent | 83 |

I.R. analysis: 88.1% 1,4-cis; 7.7% 1,4-trans; 4.2% 1,2. Unsaturated total, 98%.

We claim:
1. A process for polymerizing butadiene to 1,4-cis high polymers comprising contacting butadiene with a multi-component catalyst system including:
  A. a compound selected from the group consisting of titanium tetraiodide, acetylacetonate of divalent cobalt and acetyl-acetonate of trivalent cobalt; and
  B. a compound selected from the group consisting of a compound having the general formula

wherein X is selected from the group consisting of halogens and Y is selected from the group consisting of halogens and

wherein R and R' are selected from the group consisting of alkyl, aryl, aralkyl and cycloalkyl and the ether, tertiary amine and tetrahydrofuran complexes thereof,
the process being effected in an inert solvent which is a solvent for both the first-named and the second-named catalytic compounds.

2. A process according to claim 1, wherein the molar ratio of the compound of the formula

to that of the compound of the transition metal is greater than 1.

3. A process for polymerizing butadiene to 1,4-cis high polymers comprising contacting butadiene with a multi-component catalyst system including:
  A. a compound selected from the group consisting of dichloro dipropoxy titanate and titanium tetrachloride;
  B. a compound selected from the group consisting of a compound having the general formula

wherein X is selected from the group consisting of halogens, and Y is selected from the group consisting of halogens and

wherein R and R' are selected from the group consisting of alkyl, aryl, aralkyl and cycloalkyl and the ether, tertiary amine and tetrahydrofuran complexes thereof; and
  C. a compound selected from the group consisting of iodine, aluminum triiodide, bismuth triiodide, lithium iodide, magnesium iodide and cobalt iodide,
the process being effected in an inert solvent which is a solvent for both the first-named and the second-named catalytic compounds.

4. A process according to claim 3 wherein the ratio of gram-atoms of iodine to gram-mols of transition metal compound is comprised between 0.25:1 and 50:1.

References Cited by the Examiner
UNITED STATES PATENTS

| | | | |
|---|---|---|---|
| 2,977,349 | 3/1961 | Brockway et al. | 260—94.3 |
| 3,056,771 | 8/1962 | Aldridge et al. | 260—94.3 |
| 3,095,406 | 6/1963 | Short et al. | 260—94.3 |

FOREIGN PATENTS

| | | |
|---|---|---|
| 1,212,108 | 10/1959 | France. |
| 1,256,231 | 2/1961 | France. |
| 1,259,291 | 3/1961 | France. |
| 1,104,188 | 4/1961 | Germany. |
| 1,113,311 | 8/1961 | Germany. |
| 799,823 | 8/1958 | Great Britain. |
| 849,589 | 9/1960 | Great Britain. |
| 877,661 | 9/1961 | Great Britain. |
| 920,244 | 3/1963 | Great Britain. |

OTHER REFERENCES

Ruff: Jour., Am. Chem. Soc., vol. 83, July 5, 1961, pages 2835–2839, QD1 A5.

JOSEPH L. SCHOFER, *Primary Examiner.*
E. J. SMITH, *Assistant Examiner.*